(12) United States Patent
Ji et al.

(10) Patent No.: US 12,487,387 B2
(45) Date of Patent: Dec. 2, 2025

(54) HIGH-QUALITY-FACTOR METASURFACE FOR PHASE CONTRAST IMAGING AND SPATIAL FREQUENCY FILTERING

(71) Applicant: The Board of Trustees of the Leland Stanford Junior University, Stanford, CA (US)

(72) Inventors: Anqi Ji, Redwood City, CA (US); Mark L. Brongersma, Menlo Park, CA (US); Jung-Hwan Song, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 806 days.

(21) Appl. No.: 17/770,985

(22) PCT Filed: Nov. 20, 2020

(86) PCT No.: PCT/US2020/061616
§ 371 (c)(1),
(2) Date: Apr. 21, 2022

(87) PCT Pub. No.: WO2021/102331
PCT Pub. Date: May 27, 2021

(65) Prior Publication Data
US 2022/0390656 A1    Dec. 8, 2022

Related U.S. Application Data

(60) Provisional application No. 62/939,295, filed on Nov. 22, 2019.

(51) Int. Cl.
*G02B 5/20* (2006.01)
*G02B 5/28* (2006.01)

(52) U.S. Cl.
CPC .............. *G02B 5/203* (2013.01); *G02B 5/28* (2013.01)

(58) Field of Classification Search
None
See application file for complete search history.

(56) References Cited

U.S. PATENT DOCUMENTS

| 6,011,874 A | 1/2000 | Gluckstad |
| 6,804,050 B2 | 10/2004 | Parks |
| 2016/0202460 A1 | 7/2016 | Zheng |

FOREIGN PATENT DOCUMENTS

| WO | WO02099511 A1 | 12/2002 |
| WO | WO2020023747 | 1/2020 |

OTHER PUBLICATIONS

Zakirullin, "Creating optical filters with angular-selective light transmission", 2015, Applied Optics vol. 54, Issue 21, pp. 6416-6419.

(Continued)

*Primary Examiner* — Robert E. Tallman
(74) *Attorney, Agent, or Firm* — LUMEN PATENT FIRM

(57) ABSTRACT

Real-space optical signal processing is provided by optical angular filters that act on amplitude and/or phase of zero order light passing through a resonant diffractive optical device. One application is to phase contrast microscopy, where the diffractive optical device can be configured to have an amplitude and phase response suitable for phase contrast microscopy. For example, 60% or more intensity attenuation of the zero order light, combined with a phase shift of the zero order light by +/−90 degrees.

17 Claims, 10 Drawing Sheets

(56) References Cited

OTHER PUBLICATIONS

Babocky et al., "Quantitative 3D Phase Imaging of Plasmonic Metasurfaces", ACS Photonics 4, 1389-1397.
Rubin et al., "Matrix Fourier optics enables a compact full-Stokes polarization camera", 2019, Science 365, 43.
Bouchal et al., "High-Resolution Quantitative Phase Imaging of Plasmonic Metasurfaces with Sensitivity down to a Single Nanoantenna", 2019, Nano Lett. 19, 1242-1250.
Roberts et al., "Optical image processing with metasurface dark modes", 2018, JOSA-A vol. 35, No. 9, 1575-1584.
Eftekhari et al., "Measuring subwavelength phase differences with a plasmonic circuit—an example of nanoscale optical signal processing", 2014, Optics Letters vol. 39, No. 10, 2994.
Kwon et al., "Single-shot quantitative phase gradient microscopy using a system of multifunctional metasurfaces", 2019, Nature Photonics v14, 109-114.
Huo et al., "Photonic Spin-Multiplexing Metasurface for Switchable Spiral Phase Contrast Imaging", 2020, Nano Lett. v20, 2791-2798.
Bouchal et al., "Geometric-Phase Microscopy for Quantitative Phase Imaging of Isotropic, Birefringent and Space-Variant Polarization Samples", 2019, Scientific Reports v9:3608.
Steiner at al., "Angular bandpass filters based on dielectric resonant waveguide gratings", 2012, Optics Express v20n20.

HIGH-QUALITY-FACTOR METASURFACE FOR PHASE CONTRAST IMAGING AND SPATIAL FREQUENCY FILTERING

CROSS-REFERENCE TO RELATED APPLICATIONS

This application is a 371 of PCT application PCT/US2020/061616 filed Nov. 20, 2020. PCT application PCT/US2020/061616 claims the benefit of U.S. Provisional application 62/939,295 filed Nov. 22, 2019.

STATEMENT OF GOVERNMENT SPONSORED SUPPORT

This invention was made with Government support under contract FA9550-18-1-0323 awarded by the Air Force Office of Scientific Research. The Government has certain rights in the invention.

FIELD OF THE INVENTION

This invention relates to phase contrast imaging and angular filtering.

BACKGROUND

When light passes through unstained cells with a spatially-variant refractive index or nanostructured materials, the intensity of the light is hardly attenuated and only the phase profile of the electromagnetic field is modified. Phase-contrast imaging is a method designed to pick up and highlight such changes in the phase profile. It can accurately visualize the minute optical path differences that light experiences as it traverses structures with similar transparency. The underlying principle of this technique is to interfere the diffracted light by a specimen (high spatial-frequency component) with an attenuated, $\pi/2$ phase-shifted undiffracted light (DC component).

This approach can be better understood with a simple model of a microscope viewing a transparent sample. Light passing through the sample can be divided into two parts: the DC part that is unaffected by the sample, and what we'll call the AC part which is light that is diffracted or otherwise affected by the sample. In conventional imaging of a transparent sample, the AC part is much smaller than the DC part. Thus the total available contrast in DC+AC with the AC part small is low. One possible contrast improvement is to try to remove the DC part as completely as possible. The resulting microscopy method is dark field imaging.

The idea of phase contrast microscopy is to exploit the DC part rather than eliminating it. This can be done by attenuating the DC part to have roughly the same magnitude as the AC part, and having the DC part be in-phase (or out of phase) with respect to the AC part in the output image (typically this requires imposing a $\pi/2$ phase shift to the DC part relative to the AC part). It can be shown that this leads to maximal intensity contrast in DC'+AC, where DC' is the attenuated and phase shifted version of the original DC part.

With this method, a spatially variant phase profile, which cannot be directly detected by sensors, is converted into an intensity variant image with enhanced contrast. Conventionally, optical phase contrast imaging requires a set of annuli placed in the Fourier plane of the imaging system. This results in not only an increased price of the imaging system, but also tedious manual alignment by a user on every occasion the system is used. Despite these issues, phase contrast imaging is a critical technique in biology and medicine to image essentially transparent objects, such as biological cells. This technique is also gaining importance in the nanotechnology field as it can provide measurement and characterization of ultrathin (essentially transparent), nanofabricated samples.

Accordingly, it would be an advance in the art to provide improved phase contrast imaging.

SUMMARY

To overcome the above referenced difficulties, we provide a high-quality-factor metasurface that can be used in any bright field microscope to achieve high-performance phase contrast imaging and more complex spatial frequency filtering. The optical system requires fewer, simpler parts and should be lower cost. It should also requires a more straight-forward alignment procedure. For the reasons above, we expect that it may find easy introduction into research labs around the globe and the market is sizable.

Here, we provide an ultracompact, essentially flat optical element that we term a high-quality-factor (high-Q) metasurface that enables more convenient phase contrast imaging. In one example, it includes a glass slide with a high refractive index layer that is patterned with a surface relief grating. Briefly, the physical concept here is that the high index layer has guided mode resonances that can be coupled to incident and/or emitted radiation via the surface relief grating. Further details, examples and embodiments of such guided mode resonance devices are considered in U.S. patent application Ser. No. 16/537,030, filed on Aug. 9, 2019, and hereby incorporated by reference in its entirety.

In an initial, proof-of-concept demonstration we have utilized silicon nitride ($Si_3N_4$) as the waveguiding layer. This type of structure is also known as guided mode resonance device, and it has been used as an optical color filter and a coupler to laser cavities. Here, we consider the use of this optical element structure to perform phase-contrast microscopy by interfacing the normally incident planewave to the guided-mode resonance at a 631 nm illumination wavelength. This facilitates 90% amplitude reduction and $\pi/2$ phase shift for the DC incident illumination while leaving the scattered, non-DC Fourier components from a specimen passing through with near unity transmission. Here we define a substantially monochromatic source as having a full-width half-maximum (FWHM) spectral bandwidth of 50 nm or less. In the example below, the source was a super continuum source that had 6 nm spectral bandwidth at an adjustable center wavelength.

In contrast with conventional phase contrast imaging (e.g., an annulus in the Fourier plane), our device can be located close to the specimen plane or in any image plane. This removes the requirement to place multiple annulus Fourier planes in the system. Also, it can be freely combined with any normal brightfield objectives to conduct phase contrast while previously, for each magnification, a new phase contrast objective has to be bought. This design change can potentially greatly decrease the cost of phase contrast imaging. At the same time, a single device designed by our method can offer adjustable contrast by changing the illumination wavelength or polarization. We expect our nanoengineered guided-mode resonance structures can be used in a conventional optical microscopes and we expect this opens a promising avenue for compact, flexible, and high-quality phase-contrast microscopy.

Applications include but are not limited to live cell microscopy, nanofabricated sample examination, and in-vivo retina imaging in ophthalmology.

Significant advantages are provided. First, our method greatly simplifies the microscopy system because it eliminates the necessity to place spatial filters in Fourier planes. The nanoengineered phase contrast slide can be inserted close to the specimen plane or in any image plane. Ideally, it can be designed as an insertable element, similar to many polarizers and color filters in microscopy. This is possible because our device is translationally invariant and does not require complicated alignment. Second, our method can potentially reduce the cost of phase contrast imaging. Conventional phase contrast imaging requires both an annulus close to the condenser and phase annulus embedded in an objective. This design is not very economical in reality since most users need to look at one sample at many different magnifications. For a new magnification, a new objective embedded with a new annulus (usually cost thousands of dollars) has to be bought. However, our device does not need to be located inside the objective. The same slide can be used with objectives with different magnification. Third, our device can lead to tunable contrast simply by changing the illumination wavelength or collection path polarizer. This is very helpful when we want to examine samples that have different phase profile.

Another capability provided by this work is to filter light and control the phase at multiple angles. This can be accomplished by either cascading/stacking elements or by incorporating multiple spatial frequencies in a single metasurface/guided mode resonator. This can help identify/highlight certain spatial frequencies in an object.

Angular filtering and phase control depends on the illumination wavelength. As such, we could scan the wavelength of a source to obtain a more complete picture of the amplitude and phase contrast generated by different samples.

DETAILED DESCRIPTION

A) General Principles

Figure 1A:
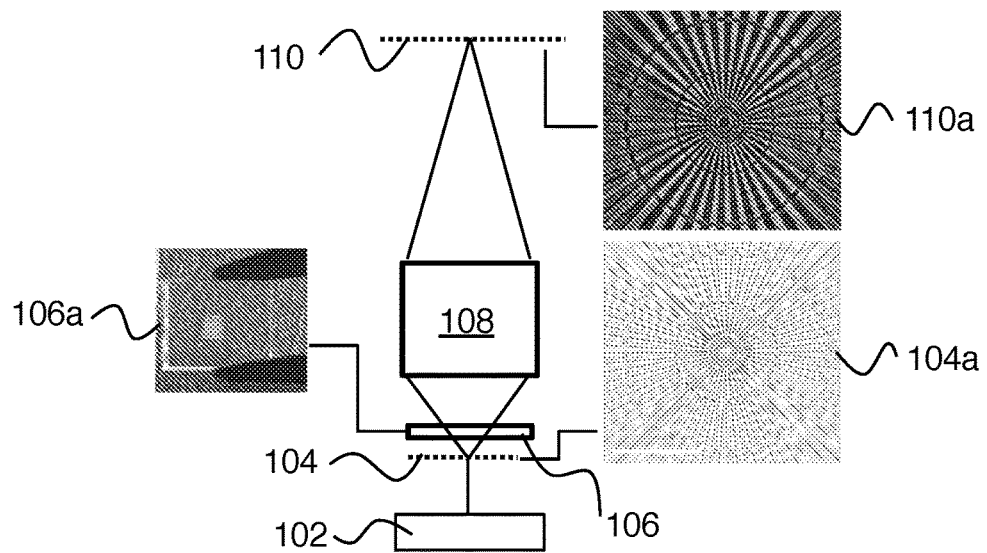
FIG. 1A shows an embodiment of the invention.

FIG. 1A schematically shows an embodiment of the invention. This example is an apparatus for optical angular filtering where the apparatus includes:

a source 102 of substantially monochromatic light;

an optical imaging system 108 configured to provide an image 110 of a scene 104 as illuminated by source 102;

a diffractive optical device 106 disposed near the scene or near an image plane of the scene. Here diffractive optical device 106 is a resonant device having a quality factor of 10 or more. In addition, diffractive optical device 106 is configured to provide optical angular filtering of light from the scene at least by altering amplitude and/or phase of zero-order light.

In this example, image 104a shows an exemplary scene 104 and image 110a is the corresponding phase contrast image provided by optical imaging system 108 combined with diffractive optical device 106. Image 106a is an image of the diffractive optical device of the work of section B below.

Figure 1B:
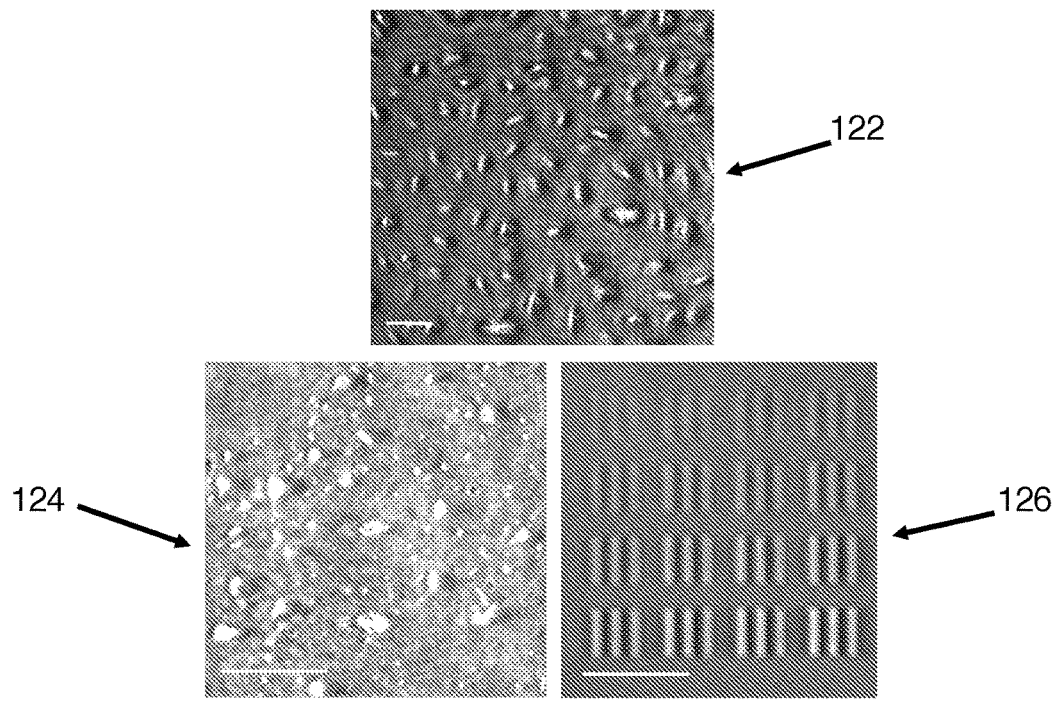
FIG. 1B shows exemplary phase contrast imaging results provided by the embodiment of FIG. 1A.

FIG. 1B shows exemplary phase contrast images provided by the apparatus of FIG. 1A. Here 122 is a phase contrast image of U2OS (*Homo sapiens* bone osteosarcoma) cells, 124 is a phase contrast image of exfoliated hBN (hexagonal boron nitride) flakes, and 126 is a phase contrast image of a phase metasurface. All scale bars correspond to 50 μm length.

Figure 2A:
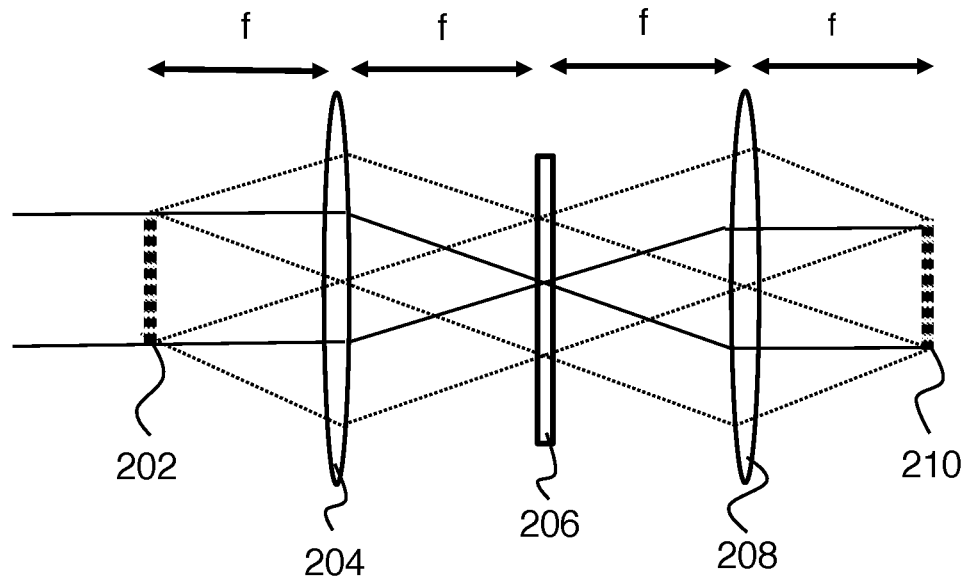
FIG. 2A shows a conventional 4f Fourier optics setup.
Figure 2B:
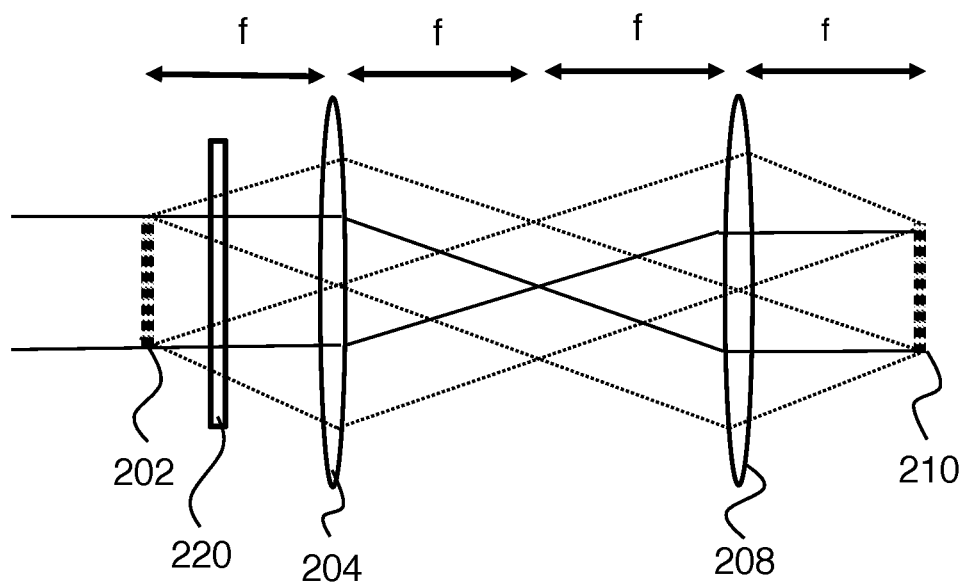
FIGS. 2B-C show two examples of optical setups suitable for use with embodiments of the invention.
Figure 2C:
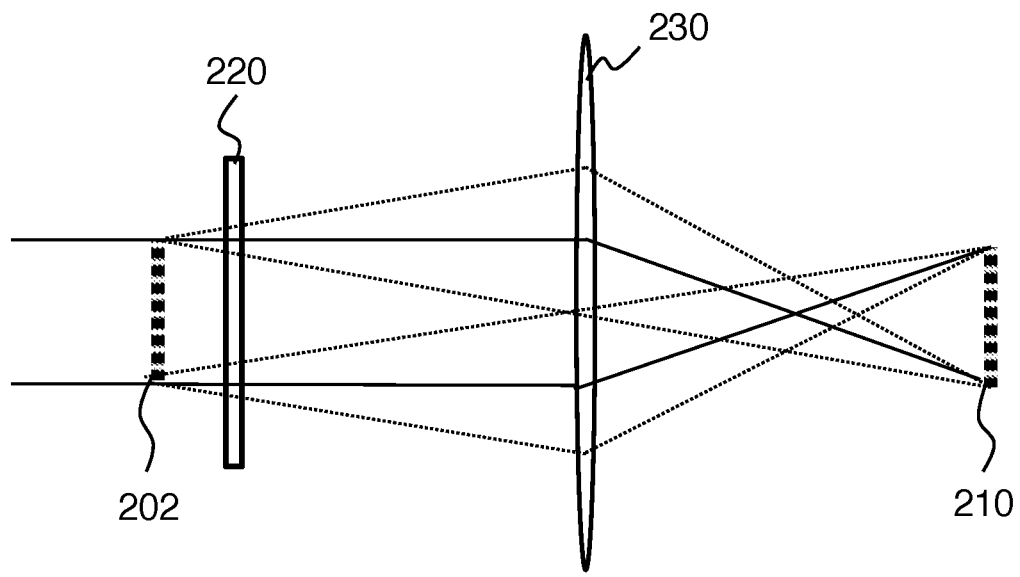
Figure 2D:
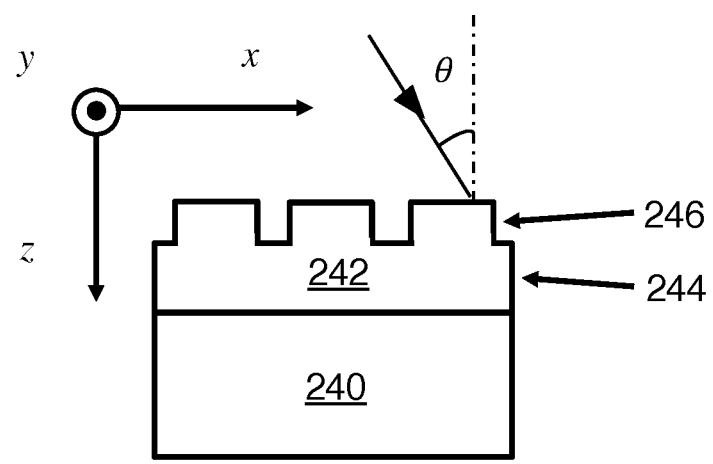
FIG. 2D schematically shows the guided mode resonance (GMR) device of the experiments of section B.

The diffractive optical device can include a waveguide having a diffraction grating (e.g., as in the example of FIG. 2D). Suitable diffractive optical devices include but are not limited to: guided-mode resonance (GMR) devices, Fabry-Perot resonance devices, Mie resonance devices, plasmonic resonance devices, volume Bragg grating devices, and photonic crystal devices.

The substantially monochromatic light preferably has a full-width half-maximum spectral bandwidth of 50 nm or less.

The resonance of the diffractive optical device can be based on light confinement in one, two or three dimensions. Examples include planar waveguides, ridge waveguides and localized optical resonators, respectively.

The diffractive optical device can be configured to provide amplitude and/or phase filtering of one or more non-zero diffraction orders.

Preferably, the diffractive optical device is configured to provide optical angular filtering of light from the scene by altering both amplitude and phase of zero-order light. Here it is further preferred that a single resonance of the diffractive optical device provides the altering amplitude and phase of zero-order light. E.g., in section B below, a single resonance of the GMR device provides both the amplitude and phase response needed for phase contrast microscopy. This advantageously avoids the need to ensure that two or more resonances are properly tuned with respect to each other to provide the desired amplitude and phase response.

The diffractive optical device can be configured to operate at normal incidence relative to the scene or at off-normal incidence relative to the scene.

Suitable materials for the diffractive optical device include but are not limited to: metals, dielectrics, semiconductors, polymers, isotropic materials and anisotropic materials.

The apparatus can be a microscope where the diffractive optical device is configured to provide attenuation and phase shift of a zero-order part of light from the scene so as to provide phase contrast imaging. The diffractive optical device can be an angular notch filter centered at normal incidence. In this case, the diffractive optical device preferably provides a relative phase shift in a range from 60 degrees to 120 degrees between light at normal incidence and light at off-normal incidence. Here the diffractive optical device preferably provides a zero order intensity transmittance between 0 and 0.4.

B) Detailed Example

B1) Introduction

Nowadays, image processing has become an essential step for most imaging tasks. In many applications such as microscopy, virtual reality and Lidar imaging, electronic post-processors are limited by slow speed, large energy consumption and loss of phase information.

Compared to an electronic processor, an optical one can directly interact with the complex light field. It also consumes less energy and calculation time. Furthermore, it can be easily scaled up to process larger images while maintaining the same processing speed and power. For large throughput real-time image processing tasks, an analog optical image processor is desired.

Fourier optics has been demonstrated as a powerful method for analog optical image processing in microscopy, x-ray imaging and remote sensing. However, its application rarely appears in consumer electronics due to its system complexity and expensive price. This challenge originates from the necessity to create Fourier planes for spatial frequency modulation. As a result, the cost and labor to convert an existing imaging system to a Fourier optics system are high.

Flat optical devices enable novel image processing at subwavelength scales. Through manipulating the scattering and resonant properties of dielectric and plasmonic nanostructures, output electric field can be used for optical computing. On one hand, single element resonators have been theoretically proposed to perform to optical computing in edge detection, differentiation and dark field imaging. On the other hand, various integrated setups combining diffractive elements and metalenses have shown the potential to provide miniaturized and multifunctional imaging systems. Despite these great advances in recent years, the relationship between Fourier image processing and flat optics was left unexplored.

Here, we provide a compact setup in which a single nanodevice is inserted in a traditional imaging system to perform real-time Fourier-type image processing (FIG. 1A). We prove the concept by applying a guided-mode resonance device (GMR) to phase contrast imaging. We experimentally demonstrate this concept by inserting a GMR device in a bright field microscope to image various types of phase objects such as biological cells, 2D semiconductors and metasurfaces. This method also shows high accuracy in quantitative phase retrieval with error within 0.01 rad.

B2) Results

B2a) Principle of Phase Contrast Imaging

Phase objects refer to objects that are optically transparent but have a spatially varying phase profile. Such phase profiles usually result from refractive index or height variance of the sample. Commonly known phase objects include unstained cells and living tissues, nano-imprinted polymer patterns, metasurfaces as well as 2D materials. Recovering the quantitative phase profile is often crucial in understanding the intrinsic structure and properties of these objects.

Various methods have been applied to image phase objects. These include non-optical methods using scanning electron microscope (SEM) and atomic force microscope (AFM), as well as optical methods such as Zernike's phase contrast imaging, dark field imaging and differentiation interference contrast imaging. Non-optical methods usually yield higher accuracy about the 3D profile of the structure but require a more time consuming and invasive measurement. By contrast, optical methods give qualitative results with measurements that are more sample friendly and easy to arrange.

Zernike's phase contrast imaging originates from the classic Fourier 4f system. The layout of 4f system is shown in FIG. 2A. The system has two lenses (204 and 208) with the same focal length f. The object 202 is placed in the front focal plane of the first lens 204 and a filter 206 is placed in its back focal plane. This back focal plane is called the Fourier plane, where different spatial frequencies of the object are focused at different locations. The second lens 208 is placed a focal distance behind the Fourier plane and the final image 210 is formed in its back focal plane. Since the total length of the system is four focal lengths, the system is referred to as a 4f system. In a mathematical way, the first 2f part conducts Fourier transform of the electric field in the object plane and projects the result in the Fourier plane, while the second 2f part conducts the inverse Fourier transform. Without any Fourier filter, 4f system is simply an imaging system that gets an inverse equal-sized image. However, by inserting a spatially variant filter 206, various types of image processing can be achieved.

The main point of Zernike's phase contrast method is a Fourier filter that modulates both the amplitude and phase of the unscattered light from the sample. We use a simple mathematical derivation to showcase the principle of Zernike's phase contrast. Imagine a one-dimensional weak phase grating that has the following phase profile, $$\varphi(x) = \Sigma_{-\infty}^{\infty} c_m \exp(imk_x x) = c_0 + \Sigma_m \quad (1)$$

$\Sigma_m$ is the sum for all non-zero spatial frequencies. With a normal incident plane wave illumination $E_0$, the transmitted electric field is $$E_t(x) = E_0 \exp(i\varphi(x)) \approx E_o \exp(ic_0) \sum_{-\infty}^{\infty} \left\{ 1 + i\Sigma_m \right\} \quad (2)$$

Here, we used Taylor expansion in the in the second step. This approximation only holds true in the weak phase regime ($c_m \ll 1$), which is the case for most phase objects. In a bright field imaging system, detectors only capture the intensity of the electric field, resulting in zero contrast when imaging a pure phase grating.

$$I_t(x) = |E_t(x)|^2 = 1 \quad (3)$$

Zernike's method exploits the relationship between different spatial components of phase objects. Compared to the straight through beam (DC component), the scattered light field (non-zero spatial frequencies) has much smaller amplitude and 90 degree phase shift, shown in Eq. 2. To enhance the effect of the scattered light field, the key is to: 1) reduce the DC background to the level similar to the level of the scattered field (noted at a here) and 2) tune its phase by +/−90 degrees. This results in the new electric field $$E_{pc}(x) = \exp(ic_0) E_0 \Sigma_{-\infty}^{\infty} \{\pm ia + i\Sigma_m\} = \exp(ic_0) E_0 i\Sigma_{-\infty}^{\infty} \{\pm a + \Sigma_m\} \quad (4)$$

With the phase contrast method, the intensity of the electric field becomes spatially varying.

$$I_{pc}(x)=|1+\Sigma_m|^2 \approx a^2+2a\Sigma_m \quad (5)$$

The intensity profile shows exactly the phase grating structure. In other words, a spatially varying phase profile is transformed into a spatially varying intensity profile. Different types of phase contrast images can be obtained by either advancing (negative contrast) or delaying (positive contrast) the phase of the DC component.

In practical implementations, the optical setup for Zernike's phase contrast method is more complex. It includes a condenser annulus and a phase plate located in two different Fourier planes. The phase plate that modulates the DC component is commonly embedded inside the objective lens. The two annuli have to be matched in diameters and well-aligned to achieve good phase contrast. Due to the nature of Fourier optics, whenever the magnification of the objective lens is changed, the location of its corresponding Fourier plane changes. Therefore, the phase plate and condenser annulus have to be modified as well. As a result, Zernike's phase contrast approach is an expensive and bulky method requiring intensive alignment by the users.

B2b) Relationship Between Angular Spectrum and Electric Field in Fourier Plane

In FIG. 2A, every focused point in the Fourier plane comes from a plane wave of different angle on the left-hand of the first lens. Indeed, spatial frequencies and angular components have a one-on-one correspondence. Unlike the electric field in the Fourier plane, the angular spectrum naturally exists in the space domain. Comparing FIG. 2A and FIG. 2B, we see that an angular filter 220 located in the space domain (FIG. 2B) is equivalent to a Fourier filter (206 on FIG. 2A).

The angular filter layout has several advantages. First, the filter location and the lens focal length are decoupled, thus making the alignment of the system much easier. Second, the need to create a Fourier plane is eliminated. There is no more need to use multiple lenses for Fourier and inverse Fourier transform. Only one lens is necessary to form an image on the sensor (e.g., as in the example of FIG. 2C where a single lens 230 provides the imaging). Last, the location of the angular filter is flexible. Since light does not change direction in free space, we can place the angular filter anywhere on the optical axis as long as its tilt is set correctly. In the case of microscopy, it can be easily designed as an insertable element close to sensor or the object.

B2c) GMR as an Angular Filter for Phase Contrast Imaging

The key requirement of angular filter for phase contrast imaging is tuning the amplitude and phase of normal incident light while letting through other angular components without modification. We use a one-dimensional guided-mode resonator to fulfill the requirement. Guided-mode resonance (GMR) is a high quality factor resonance commonly used as narrowband color filter. The structure of the GMR device in this example is shown in FIG. 2D. It includes a waveguide 244 with relief grating 246 on the top. Here 240 is a quartz substrate and 242 is silicon nitride. The gratings only efficiently couple light of particular wavelength and angle. Diffracted by the gratings, the coupled light gains a parallel k momentum and becomes guided in the waveguide under total internal reflection. As it travels along the waveguide, light gradually leaks from the grating coupler.

The transmission spectra of guided-mode resonances have a characteristic Fano line shape. This can be explained by the interference of the two pathways of the resonator.

When light is incident on a GMR device, there are two pathways: the direct pathway formed by Fabry-Perot resonance and the indirect pathway through grating couplers. When the two pathways have the same amplitude and opposite phase, no light transmits in the forward direction. Because of the intrinsic interference of the two pathways, around resonance, light naturally gets 90-degree phase advanced or delayed.

Figure 2E:
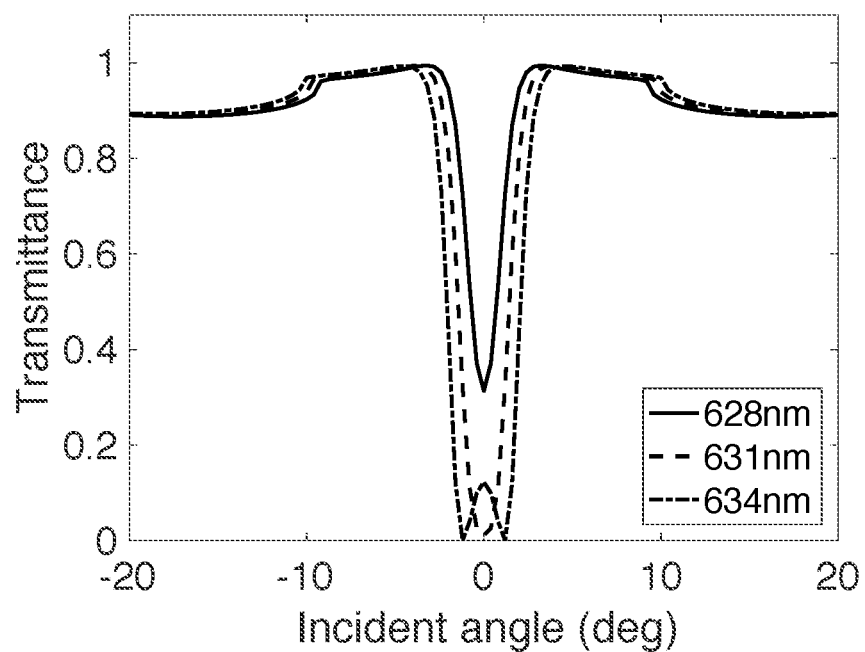
FIGS. 2E-F show the amplitude and phase response of the device design of FIG. 2D.
Figure 2F:
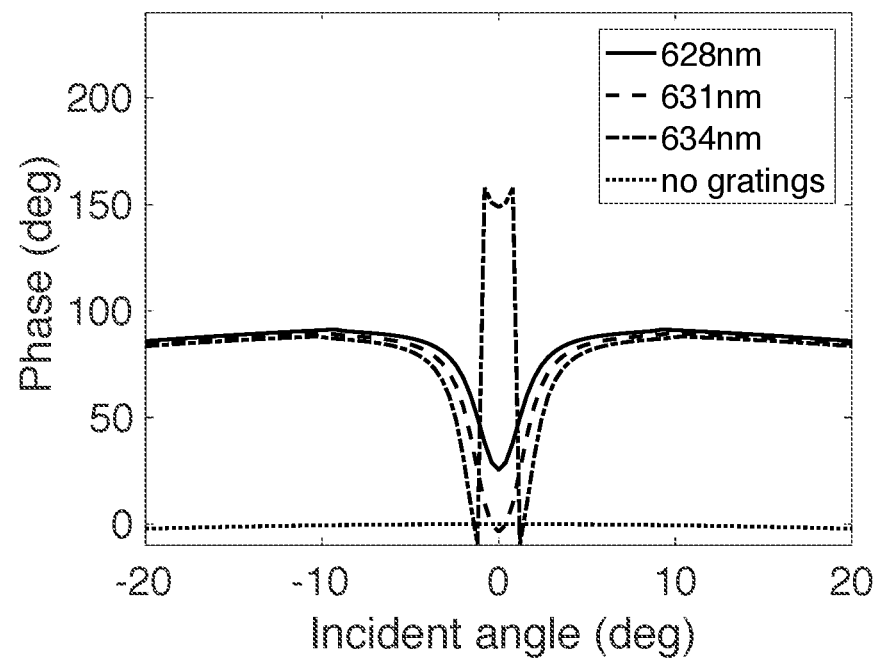

The angular transmission spectrum of this GMR device is shown in FIGS. 2E-F (amplitude and phase, respectively). At normal incidence, the grating couplers satisfy the coupling condition. As a result, the transmitted light amplitude is substantially reduced and the transmitted light is 90-degree phase delayed compared to other angles. This makes a GMR-based angular filter an ideal candidate for phase contrast imaging.

Figure 3A:
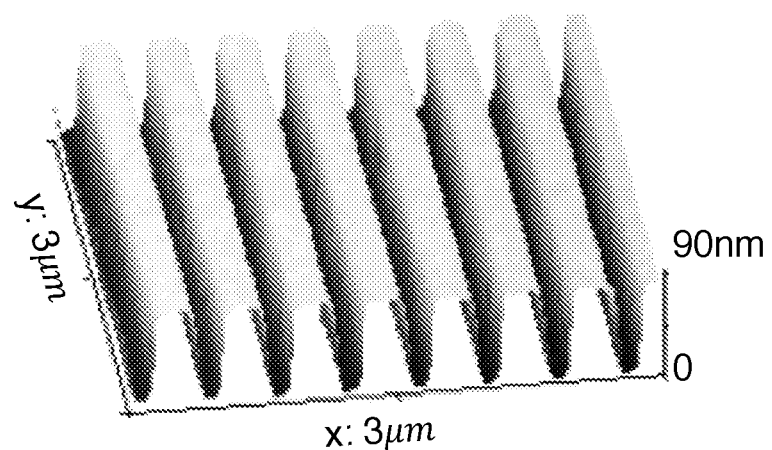
FIG. 3A is an image of a fabricated GMR device.
Figure 3B:
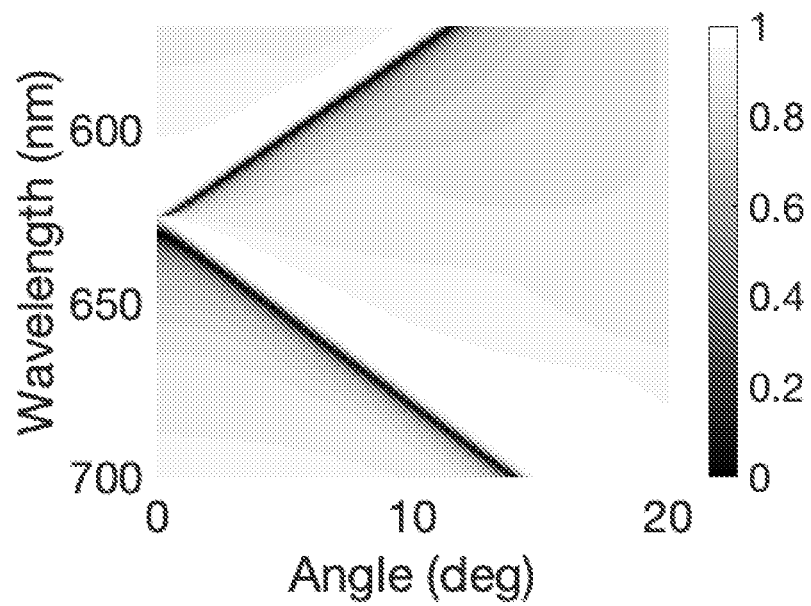
FIG. 3B is simulated angular response of the GMR device.
Figure 3C:
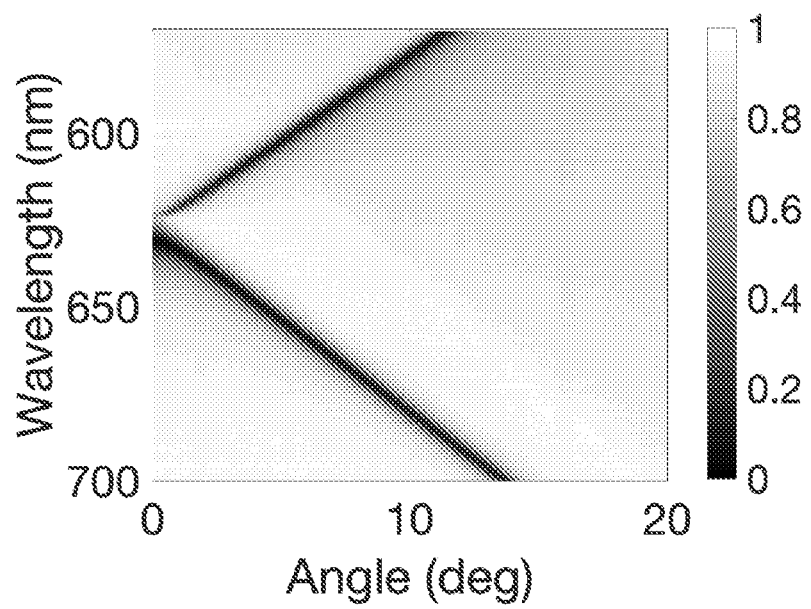
FIG. 3C is measured angular response of the GMR device.
Figure 3D:
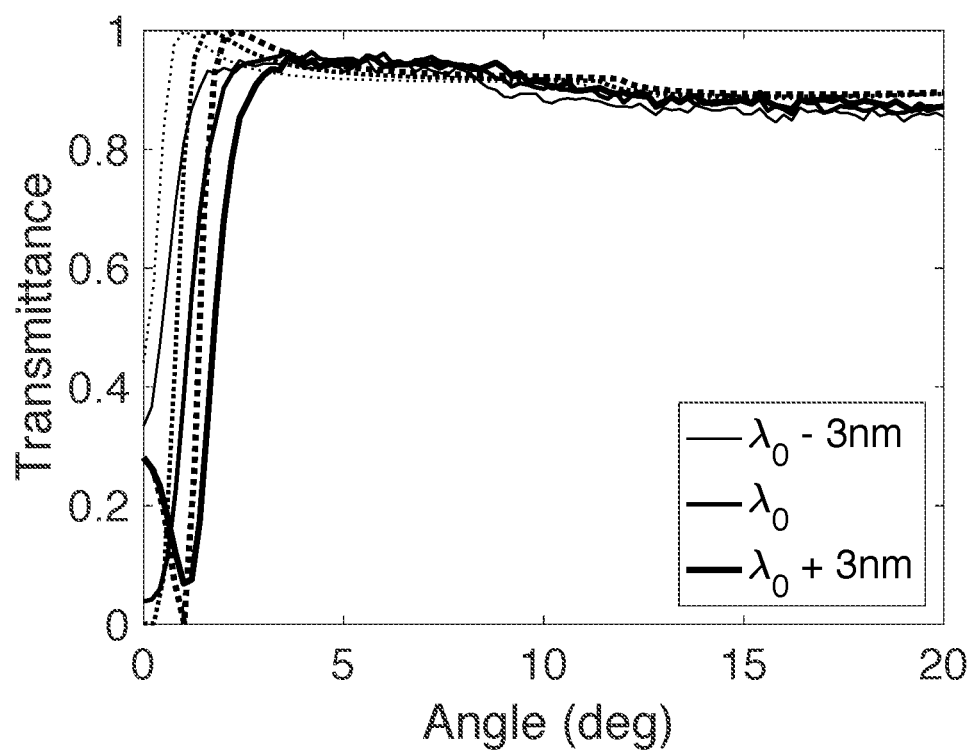
FIG. 3D shows simulated and experimental transmittance vs. angle for the GMR device at on-resonance and near-resonance wavelengths.

We experimentally validated the angular and spectral response of the designed GMR device. FIG. 3A shows an AFM (atomic force microscope) image of our fabricated structure. We illuminate the GMR device with light of different wavelengths using a super continuum source. FIGS. 3B-C are simulated and measured transmittance of the GMR device, respectively. As shown in FIG. 3B, at resonance wavelength, GMR blocks close to 100% of the light while away from the resonance light fully transmits. Then, we validate the transmission dispersion using a home-built angular setup. From FIG. 3C, we see the measured transmittance dispersion well matches with our simulation. The subtle difference in the background transmission results from the small amount of reflection from the backside of quartz substrate. FIG. 3D shows angle-dependent transmission of the GMR device for wavelengths at resonance or at +/−3 nm from resonance. The solid lines are experimental results and the dashed lines are corresponding simulation results.

B2d) Comparing Different Imaging Methods for Phase Objects

Figure 4A:
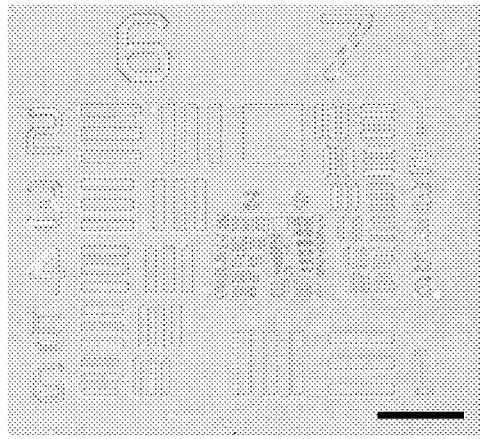
FIG. 4A-D show a comparison of imaging methods applied to the same scene.
Figure 4B:
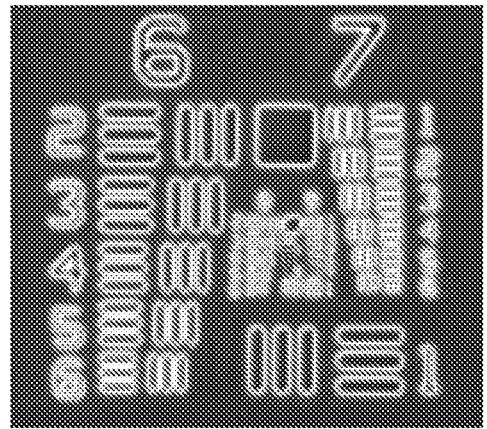
Figure 4C:
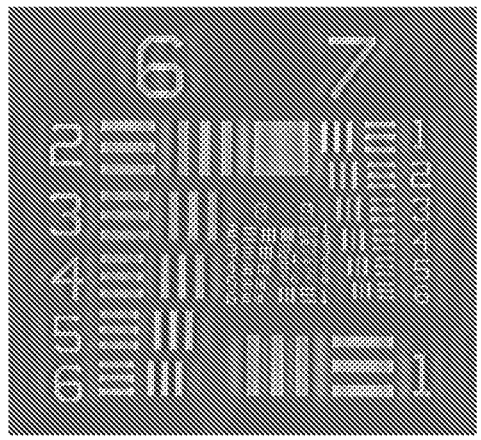

We compare different methods to image the same phase object to showcase the performance of GMR contrast. Here, we used a commercially available US air force target with elevated polymer patterns (the features of this target are 200 nm high and have n=1.5). The transmission images of different imaging methods are shown in FIGS. 4A-D. Here FIG. 4A is a bright field image (scale bar here is 50 µm), FIG. 4B is a Zernike phase contrast image, FIG. 4C is a simulation of angular filtering as described above, and FIG. 4D is an experimental image of angular filtering as described above. FIG. 4E shows the pixel line profiles of the first element of group 7 (line width 3.71 um). Here the line scans from top to bottom correspond to the images of FIGS. 4A-4D respectively. All methods share the same numerical aperture (NA=0.45). For easy comparison, we define contrast using Michelson's definition for a single spatial frequency to avoid the influence from the modulation transfer function of the imaging system itself:

$$C = \frac{I_{max} - I_{min}}{I_{max} + I_{min}} \quad (6)$$

In the bright field image (FIG. 4A), we see close to zero contrast. In the line scan, most contrast we see comes from the slight chromatic dispersion of the phase sample. In fact, when phase samples are fully in focus being imaged by a high NA imaging system with monochromatic light source, the contrast is exactly zero.

Zernike's phase contrast imaging (FIG. 4B) is an apparent advance compared to bright field imaging. The contours of the structures are well revealed with much higher contrast. However, its line profile does not faithfully reproduce the sample morphology due to the lack of accuracy in spatial frequency filtering. Usually, the phase annulus not only modulates the DC component, but also a significant amount of low spatial frequencies. Without the correct spatial frequency superposition, the final images have characteristic artifacts called halo and shade-off. Therefore, Zernike's method is not a good candidate for quantitative phase retrieval.

Figure 4D:
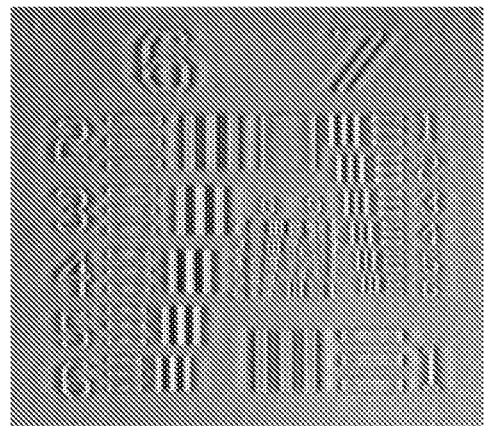
Figure 4E:
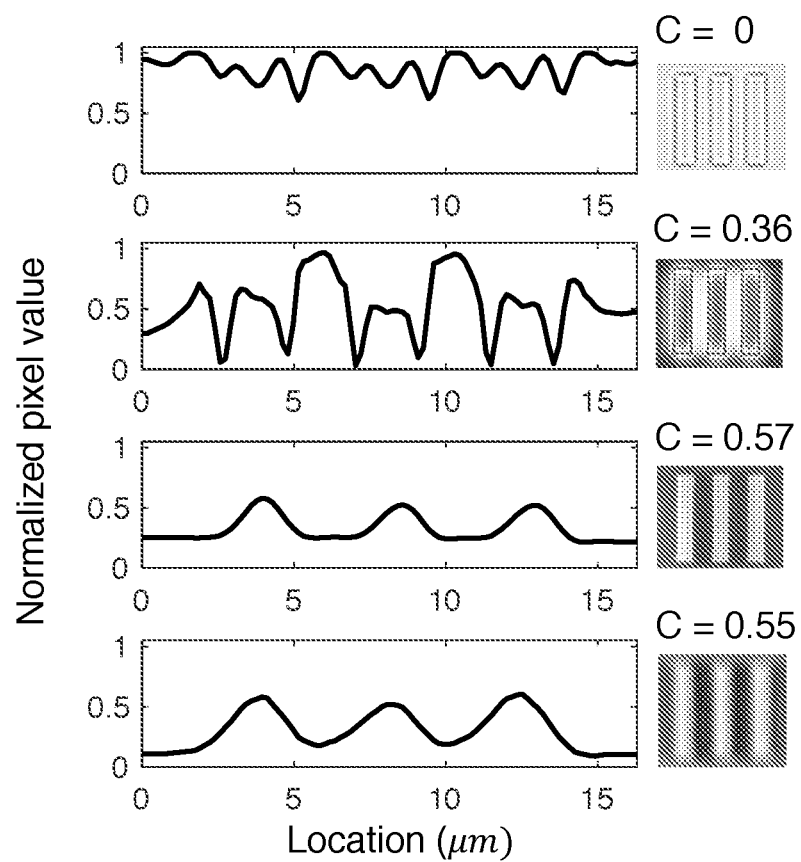
FIG. 4E shows contrast measurements from the images of FIGS. 4A-D.

FIGS. 4C-D show the simulated and measured GMR contrast images, respectively. We can see that both show higher contrast compared to Zernike's method as well as provide a more faithful phase profile. Features as small as 700 nm (Group 9, element 4) are also resolved, proving that the resolution of this imaging method is set by the numerical aperture rather than the GMR filter.

B2e) Quantitative Phase Retrieval Using GMR Contrast Filter

In recent years, metasurfaces have gained significant interest in the photonics and optics field. Metasurfaces use spatially varying building blocks to modify the properties of the light field. An important branch of metasurfaces is metalenses, which use nano-blocks to embed a quadratic phase profile on the incident light. For such applications, a quantitative characterization of the phase profile of fabricated sample is important.

Figure 5A:
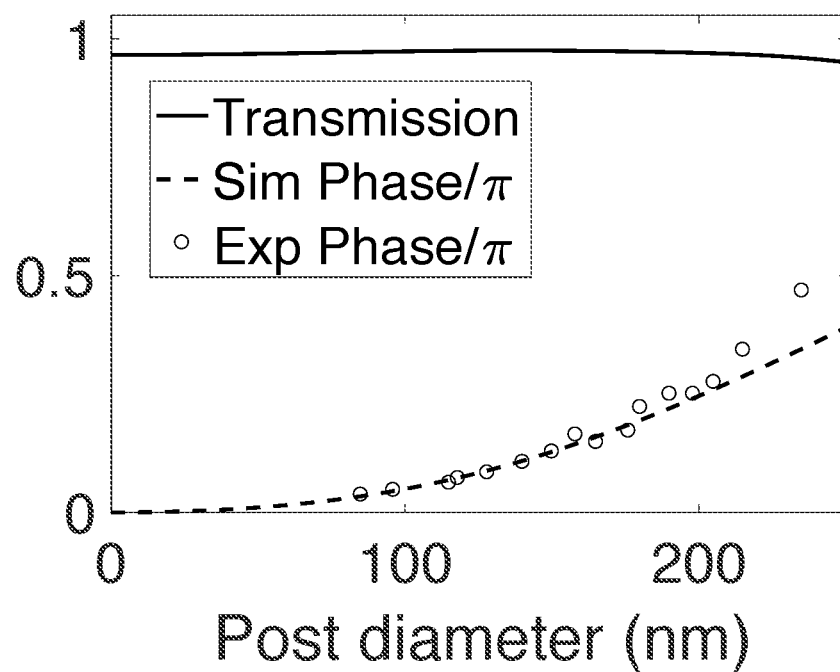
FIGS. 5A-D relate to quantitative phase measurements from phase contrast imaging.
Figure 5B:
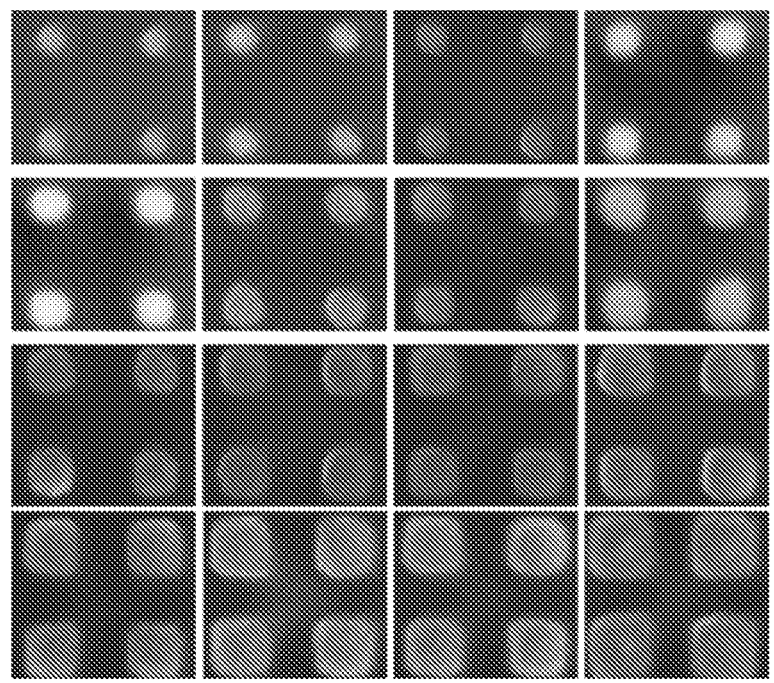
Figure 5C:
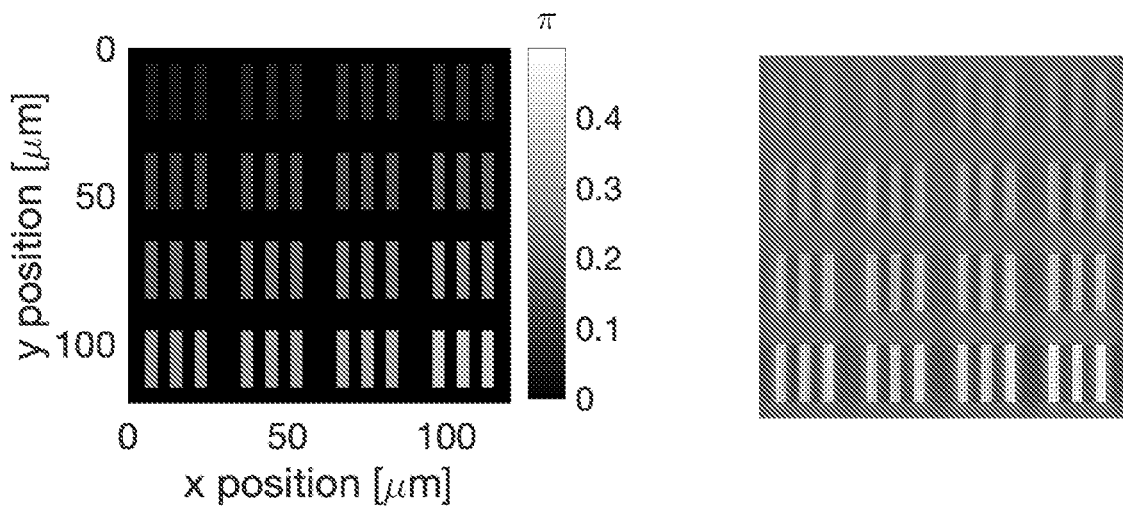
Figure 5D:
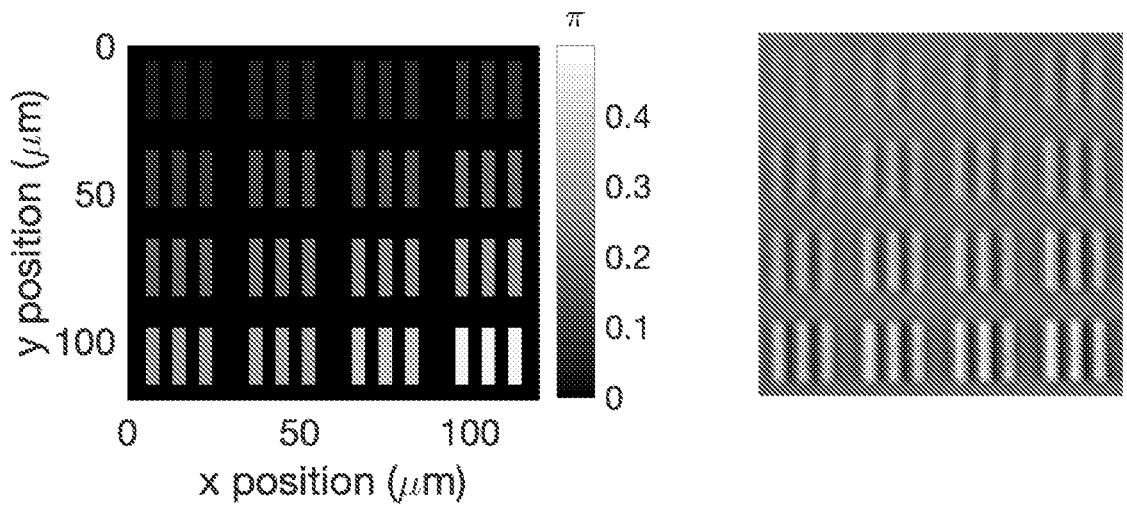

To validate its performance on quantitative phase retrieval, we apply GMR contrast imaging to a metasurface having silicon nitride nano-posts arranged in a square lattice (Lattice constant a=360 nm) disposed on a quartz substrate. FIG. 5A shows the dependence of phase shift on post diameter, both simulated and experimental. Depending on the area, the side length of the nano-post varies. The SEM images in FIG. 5B show different regions of the fabricated phase metasurface. FIG. 5C shows simulated quantitative phase recovery phase using a GMR angular filter, where the left image is the phase map and the right image is the simulated GMR contrast image. FIG. 5D shows measured quantitative phase recovery phase using a GMR angular filter, where the left image is the phase map and the right image is the measured GMR contrast image.

As the first step, we calibrate the GMR contrast using the USAF target. Then, we apply GMR contrast imaging to a phase metasurface whose phase delay ranges from about $0.04\pi$ to $0.4\pi$. The recovered phase profile (FIG. 5D, right) agrees well with the simulated result (FIG. 5C, right). Particularly in weak phase regime ($<0.4\pi$), the accuracy is close to $0.01\pi$ rad. This shows that GMR contrast shows high accuracy in obtaining quantitative phase profile.

B3) Discussion

One limitation of this GMR contrast method is its sensitivity to polarization of the illumination. Since our GMR device is designed to be one dimensional, it only performs phase contrast when the incident light is TM polarized (magnetic field parallel to the gratings). In our setup, a linear polarizer was inserted in the illumination path in order to get high contrast enhancement. To achieve polarization independence, it is possible to design a 2D GMR arranged in square lattice or hexagonal lattice. Ideally, a fully isotropic design is preferred for image processing purpose.

The angular sensitivity nature of GMR also requires good tilt adjustment of the device. The tilt of the GMR device was carefully adjusted by putting a 3D printed GMR device holder on top of the imaging sample. For commercial applications, it is ideal to fix the GMR device on an insertable holder similar to those for many polarizers and pinholes in microscopes. When an objective with short working distance is used, it is better to place the GMR device at other image planes so that the GMR device won't mechanically interfere with the objective.

B4) Summary and Outlook

These results show that flat optics can be used for optical image processing in the space domain. When designed as angular sensitive filters, flat optics are capable of modulating different spatial frequencies in the space domain. Particularly, we demonstrate the concept by using GMR device for phase contrast imaging. Compared to Zernike's method, GMR contrast can maintain a high contrast for a broader range of phase objects. The accurate angular components modulation opens a new venue to quantitative phase imaging with a compact, convertible and flexible setup. We envision that flat optics will play an important role in reducing the burden on digital image processing.

B5) Methods

B5a) Simulation and Design

The GMR device includes silicon nitride ($SiN_x$) gratings with subwavelength periodicity of 390 nm. The width of the grating lines is 230 nm while their height is 90 nm. The nitride waveguide thickness is 136 nm. The simulated transmission spectrum and field plot simulation results were obtained using rigorous coupled wave analysis technique. The optical properties of the phase metasurface was simulated using the same software. The silicon nitride nano-posts are arranged in square lattice with lattice constant of 360 nm. The height of the nano-posts are fixed at 226 nm, while the post diameter varies from 100 nm to 250 nm. In all simulations, the refractive index of quartz is 1.45 while the nitride index at the resonant wavelength is 2.02. The nitride index is obtained from ellipsometry (Woollam M2000) of fabricated sample.

B5b) Fabrication of GMR Device

A 230 nm thick silicon nitride film was deposited using plasma-enhanced chemical vapor deposition (PECVD) on an amorphous quartz substrate. For the patterning, we used positive-toned CSAR 62 (9%) with about 200 nm thickness. A 1 mm×1 mm area GMR was patterned using electron-beam lithography (JEOL JBX-6300F5). To avoid stitching error between writing fields, multipass method was applied. After developing the sample, 90 nm thick nitride was etched away using a mixture of carbon tetrafluoride, fluoroform and argon plasma. (Oxford 80 reactive ion etcher). During dry etching, the remaining CSAR serves as a hard mask. After the dry etching, the CSAR mask was removed by soaking in acetone overnight.

B5c) Fabrication of Phase Metasurface

The nitride film was deposited using the same method as GMR. For the patterning, we used positive-toned PMMA-MMA bi-layer as the E-beam resist. The phase metasurface was patterned using the same electron beam tool. After developing the sample, a 50 nm chromium mask was deposited using electron beam evaporation. The remained PMMA-MMA was lifted off by acetone. With the same dry etching recipe, 230 nm of nitride is etched away. Finally, the chromium mask was removed by soaking in chromium etchant for 15 min.

B5d) Phase Sample Preparation

The phase samples we used here include U2OS cells, a polymer-based US air force target, a silicon nitride phase metasurface and hexagonal boron nitride flakes. The U2OS sample was fixed on glass side using poly-L-lysine, glutaraldehyde and gelatin after plasma cleaning the quartz slide.

The polymer phase target was purchased from Benchmark technologies. The raised structures are fabricated with electron beam patterned replica of polymers with refractive index 1.52.

B5e) Measurement Procedure

In this setup, a plane wave generated from halogen lamp is illuminated on the sample and the transmitted light is collected by a fiber that connects to a spectral meter (Princeton instruments Spectra Pro 2300i). The sample is mounted on a high precision rotational stage (Newport). By rotating the sample at different angles, we can measure the transmittance at different angles. The normalized transmittance is achieved through measuring the light both with and without the sample. By placing a polarizer in the collection path, transmittance at one polarization can be obtained.

B5f) Nikon Imaging System

All images were taken by a Nikon LV-UDM microscope in the transmission mode. The objective used for bright field imaging is a normal objective lens (CFI Super Plan Fluor ELWD 20×, NA 0.45). For Zernike's phase contrast, a special lens (CFI Super Plan Fluor Phase contrast ADM ELWD 20×) and a condenser annulus (D-C Phase ring, Module PH-1 Dry) were used. In the GMR contrast setup, a narrowband light source was achieved using NKT super continuum source (FWHM=6 nm). The NKT source was collimated by a reflective collimator (Thorlabs RCO4FC-P01). Two pinholes were inserted in the illumination path to minimize the angular dispersion. The phase objects were placed on the microscope stage. GMR device was placed on top of the phase object with a separation of roughly 500 um. The same objective lens was used for bright field imaging and for GMR imaging to provide consistency.

The invention claimed is:

1. Apparatus for optical angular filtering, the apparatus comprising:
   a source of substantially monochromatic light;
   an optical imaging system configured to provide an image of a scene as illuminated by the source;
   a diffractive optical device disposed near the scene or near an image plane of the scene;
   wherein the diffractive optical device is a resonant device having a quality factor of 10 or more;
   wherein the diffractive optical device is configured to provide optical angular filtering of light from the scene at least by altering amplitude and/or phase of zero-order light.

2. The apparatus of claim 1, wherein the diffractive optical device includes a waveguide having a diffraction grating.

3. The apparatus of claim 1, wherein the diffractive optical device is selected from the group consisting of: guided-mode resonance devices, Fabry-Perot resonance devices, Mie resonance devices, plasmonic resonance devices, volume Bragg grating devices, and photonic crystal devices.

4. The apparatus of claim 1, wherein the substantially monochromatic light has a full-width half-maximum spectral bandwidth of 50 nm or less.

5. The apparatus of claim 1, wherein the diffractive optical device is also configured to provide amplitude and/or phase filtering of one or more non-zero diffraction orders.

6. The apparatus of claim 1, wherein the diffractive optical device is configured to provide optical angular filtering of light from the scene by altering amplitude and phase of zero-order light.

7. The apparatus of claim 6, wherein a single resonance of the diffractive optical device provides the altering amplitude and phase of zero-order light.

8. The apparatus of claim 1, wherein the diffractive optical device is configured to operate at normal incidence relative to the scene.

9. The apparatus of claim 1, wherein the diffractive optical device is configured to operate at off-normal incidence relative to the scene.

10. The apparatus of claim 1, wherein the diffractive optical device includes one or more materials selected from the group consisting of: metals, dielectrics, semiconductors, polymers, isotropic materials and anisotropic materials.

11. The apparatus of claim 1, wherein the apparatus is a microscope and wherein the diffractive optical device is configured to provide attenuation and phase shift of a zero-order part of light from the scene so as to provide phase contrast imaging.

12. The apparatus of claim 11, wherein the diffractive optical device is an angular notch filter centered at normal incidence.

13. The apparatus of claim 11, wherein the diffractive optical device provides a relative phase shift in a range from 60 degrees to 120 degrees between light at normal incidence and light at off-normal incidence.

14. The apparatus of claim 11, wherein the diffractive optical device provides a zero order intensity transmittance between 0 and 0.4.

15. The apparatus of claim 1, wherein a resonance of the diffractive optical device is based on light confinement in one dimension.

16. The apparatus of claim 1, wherein a resonance of the diffractive optical device is based on light confinement in two dimensions.

17. The apparatus of claim 1, wherein a resonance of the diffractive optical device is based on light confinement in three dimensions.

* * * * *